(12) United States Patent
Hunt et al.

(10) Patent No.: US 10,807,580 B2
(45) Date of Patent: Oct. 20, 2020

(54) TRAILER ANTILOCK BRAKING SYSTEM

(71) Applicant: Robert Bosch GmbH, Stuttgart (DE)

(72) Inventors: Trevor Hunt, Farmington Hills, MI (US); Daniel Maitlen, South Lyon, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 188 days.

(21) Appl. No.: 15/777,138

(22) PCT Filed: Oct. 28, 2016

(86) PCT No.: PCT/EP2016/076014
§ 371 (c)(1),
(2) Date: May 17, 2018

(87) PCT Pub. No.: WO2017/072271
PCT Pub. Date: May 4, 2017

(65) Prior Publication Data
US 2018/0334152 A1      Nov. 22, 2018

Related U.S. Application Data

(60) Provisional application No. 62/248,620, filed on Oct. 30, 2015.

(51) Int. Cl.
*B60T 8/171*      (2006.01)
*B60T 8/32*       (2006.01)
(Continued)

(52) U.S. Cl.
CPC .............. *B60T 8/323* (2013.01); *B60T 8/171* (2013.01); *B60T 8/172* (2013.01); *B60T 8/176* (2013.01);
(Continued)

(58) Field of Classification Search
CPC ........ B60T 8/323; B60T 8/1708; B60T 8/171; B60T 8/172; B60T 8/176; B60T 2230/00; B60T 2250/00; B60T 2270/10
See application file for complete search history.

(56) References Cited

U.S. PATENT DOCUMENTS

| 4,196,936 A | 4/1980 | Snyder |
| 7,401,871 B2 * | 7/2008 | Lu ............................. B60T 7/20 180/6.24 |

(Continued)

FOREIGN PATENT DOCUMENTS

WO      20020024501 A1      3/2002

OTHER PUBLICATIONS

Choi, Antilock Brake System With a Continuous Wheel Slip Control to Maximize the Braking Performance and the Ride Quality, 2008, IEEE, p. 996-1003 (Year: 2008).*

(Continued)

*Primary Examiner* — McDieunel Marc
(74) *Attorney, Agent, or Firm* — Michael Best & Friedrich LLP (57) ABSTRACT

Techniques of braking a trailer with a trailer braking system. In one example, a controller receives a brake request from a vehicle to apply the trailer braking system, receives a plurality of wheel speed signals from a plurality of wheel speed sensors, and determines a velocity of the trailer based on the plurality of wheel speed signals. The controller determines a wheel speed of one of a plurality of wheels based on one of the plurality of wheel speed signals, compares the velocity of the trailer to the wheel speed to obtain a difference value, and determines that one of the plurality of wheels is unstable when the difference value exceeds a threshold. A braking signal to reduce a braking force on one of the plurality of wheels is generated when one (Continued)

of the plurality of wheels is unstable and when the brake request is received.

17 Claims, 7 Drawing Sheets

(51) Int. Cl.
*B60T 8/17* (2006.01)
*B60T 8/172* (2006.01)
*B60T 8/176* (2006.01)

(52) U.S. Cl.
CPC ......... *B60T 8/1708* (2013.01); *B60T 2230/06* (2013.01); *B60T 2240/00* (2013.01); *B60T 2250/00* (2013.01); *B60T 2270/10* (2013.01)

(56) References Cited

U.S. PATENT DOCUMENTS

| | | | |
|---|---|---|---|
| 8,060,288 B2* | 11/2011 | Choby | B60T 7/20 701/70 |
| 8,374,757 B2* | 2/2013 | Choby | B60T 7/20 701/51 |
| 9,016,807 B1* | 4/2015 | Pieronek | B60T 8/1708 303/123 |
| 9,440,632 B2* | 9/2016 | Bennett | B60T 8/171 |
| 9,834,187 B2* | 12/2017 | Englert | B60T 7/20 |
| 10,336,195 B2* | 7/2019 | Suzuki | B60L 15/2009 |
| 2004/0148085 A1 | 7/2004 | Heuer | |
| 2006/0033308 A1 | 2/2006 | Waldbauer et al. | |
| 2008/0172163 A1* | 7/2008 | Englert | B60T 7/20 701/83 |
| 2013/0268160 A1 | 10/2013 | Trombley et al. | |
| 2014/0200786 A1* | 7/2014 | Morselli | B60T 8/1887 701/74 |
| 2014/0343813 A1* | 11/2014 | Morselli | B60T 8/1708 701/70 |

OTHER PUBLICATIONS

Anwar et al., An Antilock-Braking Algorithm for an Eddy-Current-Based Brake-By-Wire System, 2007, IEEE, p. 1100-1107 (Year: 2007).*
Anwar, An anti-lock braking control system for a hybrid electromagnetic/electrohydraulic brake-by-wire system, 2004, IEEE, p. 2699-2704 (Year: 2004).*
Xiet et al., Optimization of Braking Force Distribution Coefficient for Car-Trailer, 2010, IEEE, p. (Year: 2010).*
International Search Report and Written Opinion for Application No. PCT/EP2016/076014 dated Oct. 28, 2017 (13 pages).
International Preliminary Reort on Patentability for Application No. PCT/EP2016/076014 dated May 1, 2018 (10 pages).
Examination Report No. 1 from the Intellectual Property Office of Australia for Application No. 2016344763 dated Jul. 12, 2018 (3 pages).
Hunt, Trevor, "The Development of an Anti-Lock Braking System for Light Vehicle Trailers" Thesis written at Robert Bosch GmbH, Jun. 2014, Kettering University (37 pages).
Notice of Acceptance from the Australian Patent Office for Application No. 2016344763 dated Dec. 18, 2018 (3 pages).

\* cited by examiner

TRAILER ANTILOCK BRAKING SYSTEM

RELATED APPLICATIONS

The present application claims priority to U.S. Provisional Application No. 62/248,620 filed on Oct. 30, 2015, the entire contents of which are incorporated herein by reference.

FIELD

Embodiments of the invention relate to braking systems for vehicle trailers.

BACKGROUND

Modern vehicle trailers may be equipped with braking systems that actuate upon receiving a braking signal from a trailer brake controller located in a towing vehicle. The braking system of the trailer provides additional braking power to assist in slowing the towing vehicle and trailer. However, if the braking system of the trailer is applied when a trailer wheel is in contact with a low mu surface, such as ice, there is a possibility that the wheel's rotation stops before the towing vehicle and the trailer have come to a stop (i.e., wheel lock). If the wheel is locked when the towing vehicle and the trailer are still moving, the trailer may experience undesirable trailer yaw. In severe cases, this may result in jack-knifing of the trailer.

SUMMARY

Among other things, embodiments disclosed herein improve trailer braking in at least some respects. In some embodiments, each wheel of the trailer is independently monitored and controlled, and as a consequence, wheel lock while braking is reduced or prevented. The trailer braking system increases tractive contact with the road surface, reduces operating cost by preventing trailer tire flat spots due to wheel lock during braking, helps to mitigate trailer jack-knifing, and helps to mitigate trailer sway.

One embodiment provides a method of braking a trailer with the trailer braking system. The method includes receiving, at a controller, a brake request from a vehicle. The controller receives a plurality of wheel speed signals from a plurality of wheel speed sensors on the trailer. The controller determines a velocity of the trailer based on the plurality of wheel speed signals and determines a wheel speed of one of the plurality of wheels based on one of the plurality of wheel speed signals. The controller compares the velocity of the trailer to the wheel speed to obtain a difference value. When the difference value exceeds a threshold, the controller determines that the one of the plurality of wheels is unstable. When the one of the plurality of wheels is unstable and when the brake request is received, the controller generates a braking signal to reduce the braking force on the one of the plurality of wheels.

Another embodiment provides a trailer braking system. The trailer braking system includes a plurality of wheel speed sensors on a trailer and a controller configured to receive a braking request from a vehicle. The controller receives a plurality of wheel speed signals from the plurality of wheel speed sensors. The controller then determines a velocity of the trailer based on the plurality of wheel speed signals and determines a wheel speed of one of the plurality of wheels based on one of the plurality of wheel speed signals. The controller compares the velocity of the trailer to the wheel speed to obtain a difference value. When the difference value exceeds a threshold, the controller determines that the one of the plurality of wheels is unstable. When the one of the plurality of wheels is unstable and when the brake request is received, the controller generates a braking signal to reduce the braking force on the one of the plurality of wheels.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A plurality of hardware and software based devices, as well as a plurality of different structural components may be used to implement embodiments of the invention. In addition, embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, aspects of the invention may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification can include one or more electronic processors, one or more memory modules including non-transitory computer-readable medium, one or more input/output interfaces, and various connections (e.g., a system bus) connecting the components.

Figure 1:
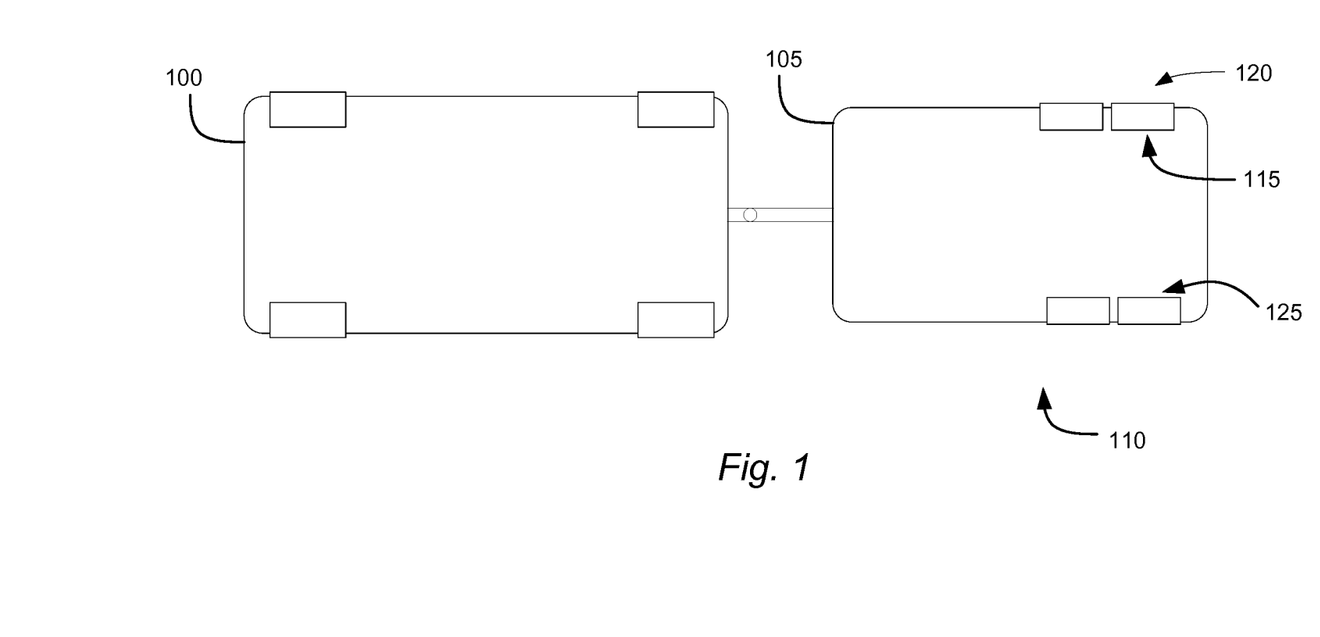
FIG. 1 is a block diagram of a towing vehicle and a trailer according to one embodiment.

FIG. 1 illustrates a towing vehicle 100 and a trailer 105. The trailer 105 includes a trailer braking system 110 (for example, an electronically-actuated, anti-lock braking system). The trailer braking system 110 includes, among other things, a plurality of trailer brakes 115 that are each positioned on a plurality of wheels 120 of the trailer 105. The trailer braking system 110 also includes a plurality of wheel speed sensors 125. Each of the plurality of wheel speed sensors 230 is positioned and associated with one of the plurality of wheels 120.

The trailer braking system 110 may be installed on various types of trailers equipped with electronic braking systems. The trailers may include gooseneck trailers, flatbed trailers, towed recreational vehicles, and others. As described below, the trailer braking system 110 may incorporate anti-lock braking functionality. In some embodiments, the trailer braking system 110 may be configured to integrate with a trailer brake controller positioned on the towing vehicle 100. In this case, a controller of the trailer braking system is mounted on the trailer and configured to be detachably coupled to the trailer brake controller. The trailer braking system 110 may integrate with original equipment manufacturer (OEM) trailer brake controllers and after-market trailer brake controllers.

Figure 2:
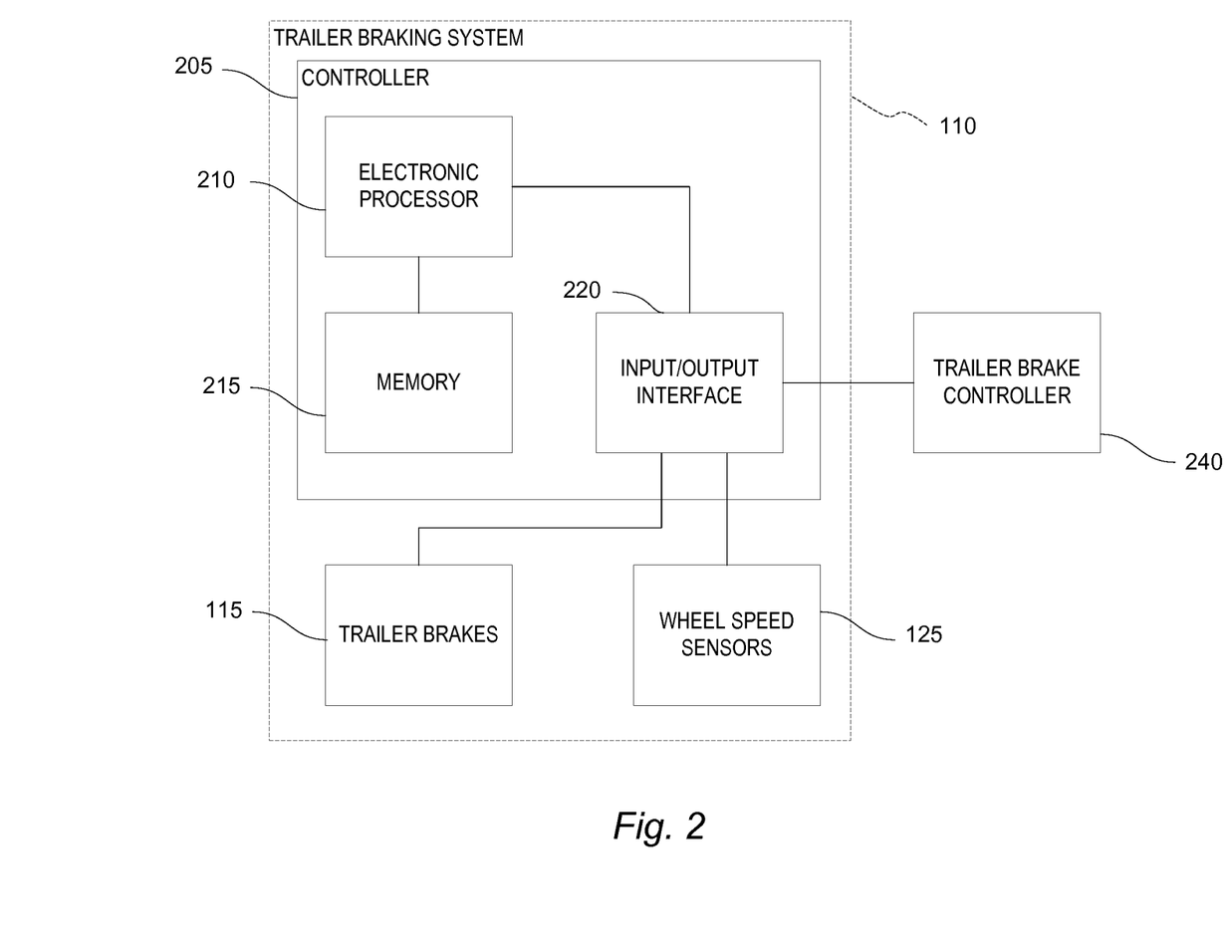
FIG. 2 is a block diagram of a trailer braking system positioned on the trailer of FIG. 1 according to one embodiment.

FIG. 2 illustrates components and connections of the trailer braking system 110 according to one embodiment. In the illustrated embodiment, the trailer braking system 110 includes a controller 205 (for example, an electronic control unit). The controller 205 is communicatively coupled to the trailer brakes 115 and the wheel speed sensors 230. For example, the controller 205 may be electrically coupled to the trailer brakes 115 and configured to send a braking signal that actuates the trailer brakes 115. In some cases, the braking signal is an electronic, pulse-width modulated signal that rapidly adjusts braking pressure applied by the trailer brakes 115. The wheel speed sensors 230 may also be electrically coupled to the controller 205. For example, the wheel speed sensors 230 may be configured to sample a wheel speed (for example, a change in wheel position over time) and to send a wheel speed signal indicative of the wheel speed and a change in wheel speed (i.e., a tangential acceleration of the wheel) to the controller 205.

The controller 205 may accommodate various styles of connectors for connectivity to the other components of the trailer braking system 110. For example, the controller 205 may be housed in an package configured with connection terminals, sockets, wire and wire harness couplers, and the like. In some embodiments, the controller 205 sends operation and fault messages to a user interface (for example, a driver display) via the trailer brake controller of the towing vehicle 100. For example, the controller 205 may communicate with the user interface, through direct wiring or wireless transmission, to display fault detection and system activity of the trailer braking system 110. Various other configurations and connections other than the particular configuration that is illustrated are contemplated.

In the example illustrated, the controller 205 includes a plurality of electrical and electronic components that provide power, operation control, and protection to the components and modules within the controller 205. The controller 205 includes, among other things, an electronic processor 210 (such as a programmable electronic microprocessor, microcontroller, or similar device), a memory 215 (e.g., non-transitory, machine readable memory), and an input/output interface 220. The electronic processor 210 is communicatively coupled to the memory 215 and executes instructions which are capable of being stored on the memory 215. The electronic processor 210 is configured to retrieve from memory 215 and execute, among other things, instructions related to processes and methods described herein. In other embodiments, the controller 205 includes additional, fewer, or different components. For example, the controller 205 may be implemented in several independent electronic control units each configured to perform specific functions or sub-functions. Additionally, the controller 205 may contain sub-modules that process input and output signals independently.

The controller 205 is configured to receive a vehicle brake signal from a trailer brake controller. The vehicle brake signal represents a request by the towing vehicle 100 to apply the trailer brakes 115. For example, when a driver of the towing vehicle 100 depresses the brake pedal, the trailer brake controller may send the vehicle brake signal to the trailer braking system 110 to initiate and control trailer braking. The trailer braking system 110 may then decide whether to actuate braking and determines a magnitude of braking in response to the request to apply the trailer brakes 115. As described below, if actuation of the trailer brakes 115 is likely to cause a particular wheel of the trailer 105 to become unstable, the trailer braking system 110 reduces or halts braking for that particular wheel. The trailer braking system 110 may actuate braking of each of the wheels 120 independently of the other wheels 120, as opposed to a traditional trailer brake controller that may send the same braking signal to all wheels of a trailer.

Figure 3:
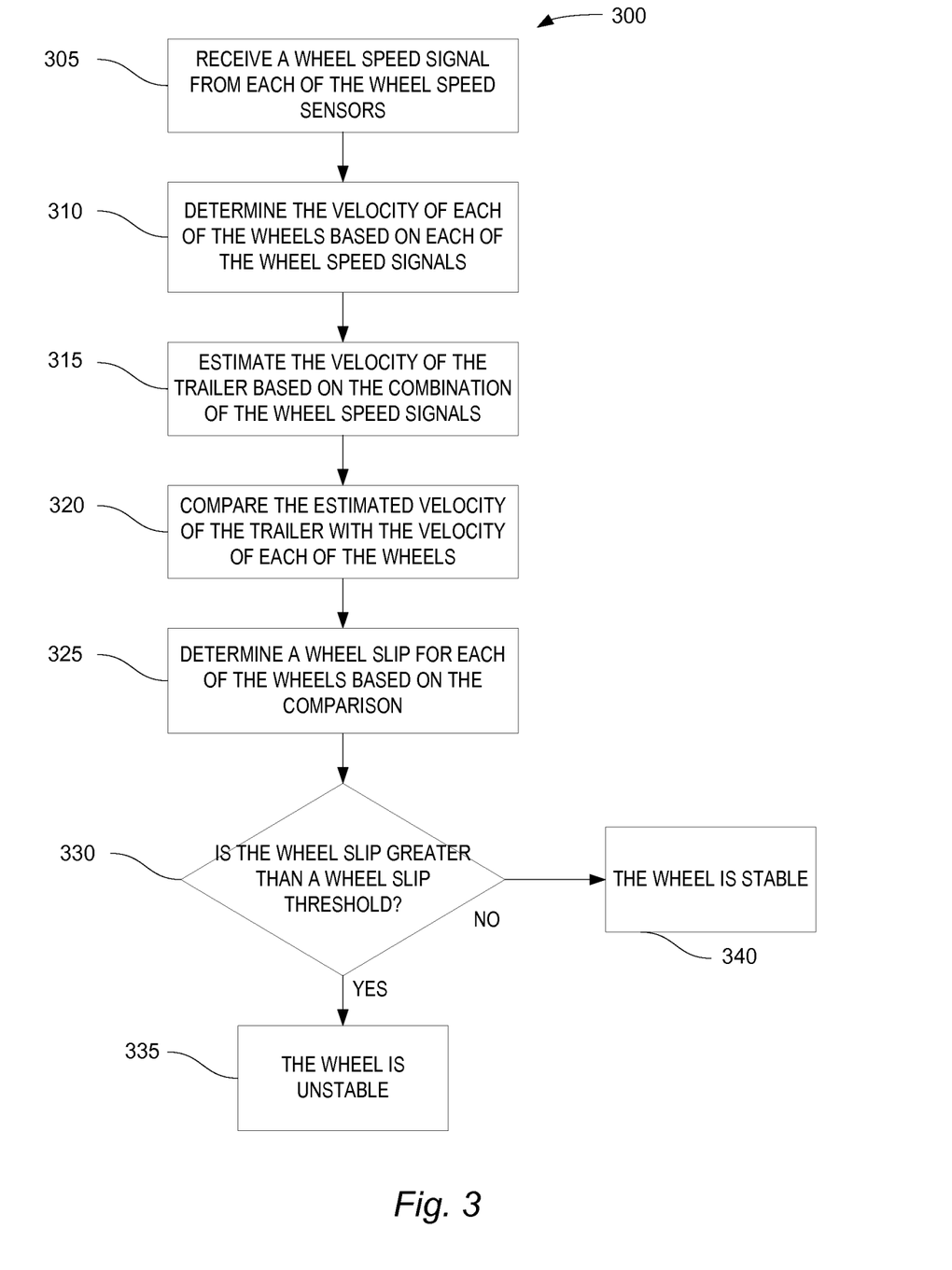
FIG. 3 is a flowchart of a method of determining whether a wheel of the trailer of FIG. 1 is unstable using the trailer braking system of FIG. 2 according to one embodiment.

FIG. 3 illustrates a method 300 of determining whether each of the wheels 120 is unstable according to one embodiment. In the example illustrated, the controller 205 receives a wheel speed single from each of the wheel speed sensors 230 (block 305). The controller 205 then determines the velocity of each of the wheels 120 based on each of the wheel speed signals (block 310). For example, each of the wheel speed sensors 125 may measure wheel speed by generating a series of pulses representing some portion of rotation of the wheel over time. Using these pulses, each of the wheel speed sensors 125 or the controller 205 itself may determine a rotational velocity of each of the wheels 120 as well as a tangential acceleration of each of the wheels 120. Based on a combination of each of the wheel speed signals, the controller 205 estimates a longitudinal velocity of the trailer 105 and, by association, a longitudinal velocity of the towing vehicle 100 (block 315). The controller 205 compares the estimated longitudinal velocity of the trailer 105 with each of the velocities determined for each of the wheels 120 (block 320).

Next, the controller 205 determines a wheel slip for each of the wheels 120 based on each of the comparisons (block 325). The controller 205 determines if the wheel slip for each of the wheels 120 is greater than a wheel slip threshold (block 330). The wheel slip threshold may be a predetermined value stored in the memory 215 (for example, in a look-up table) and may depend on the velocity of the trailer 105. Some amount of wheel slip is acceptable at certain velocities, but the same amount of wheel slip may result in an unstable condition at other velocities. The controller 205 may reference the look-up table for a wheel slip threshold value associated with the velocity that was previously estimated. When the wheel slip for a particular wheel is greater than the wheel slip threshold, the controller 205 determines that the particular wheel is unstable (block 335). When this occurs, the controller 205 may set a status flag in the memory 215 associated with the particular wheel to "unstable." Conversely, when the wheel slip for the particular wheel is less than the wheel slip threshold, the controller 205 determines that the particular wheel is stable (block 340). When this occurs, the controller 205 may set the status flag to "stable." In addition, the controller 205 may automatically set the status flag to stable whenever the estimated velocity of the trailer 105 is less than a minimum velocity threshold. For example, when the velocity of the trailer 105 is approximately zero, thus indicating that the trailer is stopped, the controller 205 may set the status flag to stable.

The wheel slip for a particular wheel of the trailer 105 indicates the relative motion between the wheel and the road surface. As such, the wheel slip provides a measure of traction between the wheel and the road surface, and thus provides a measure of stability for each of the wheels 120. In some embodiments, each of the wheels 120 is considered unstable by the controller 205 only if the relative velocity of the wheel is significantly different (for example, above the wheel slip threshold) than the velocity of the trailer 105. In this case, the controller 205 may set a status flag for each wheel indicating that the wheel is or is not unstable based only on the wheel slip for each of the wheels 120. In other embodiments, additional factors are considered by the controller 205 when determining of stability of each of the wheels 120.

Figure 4:
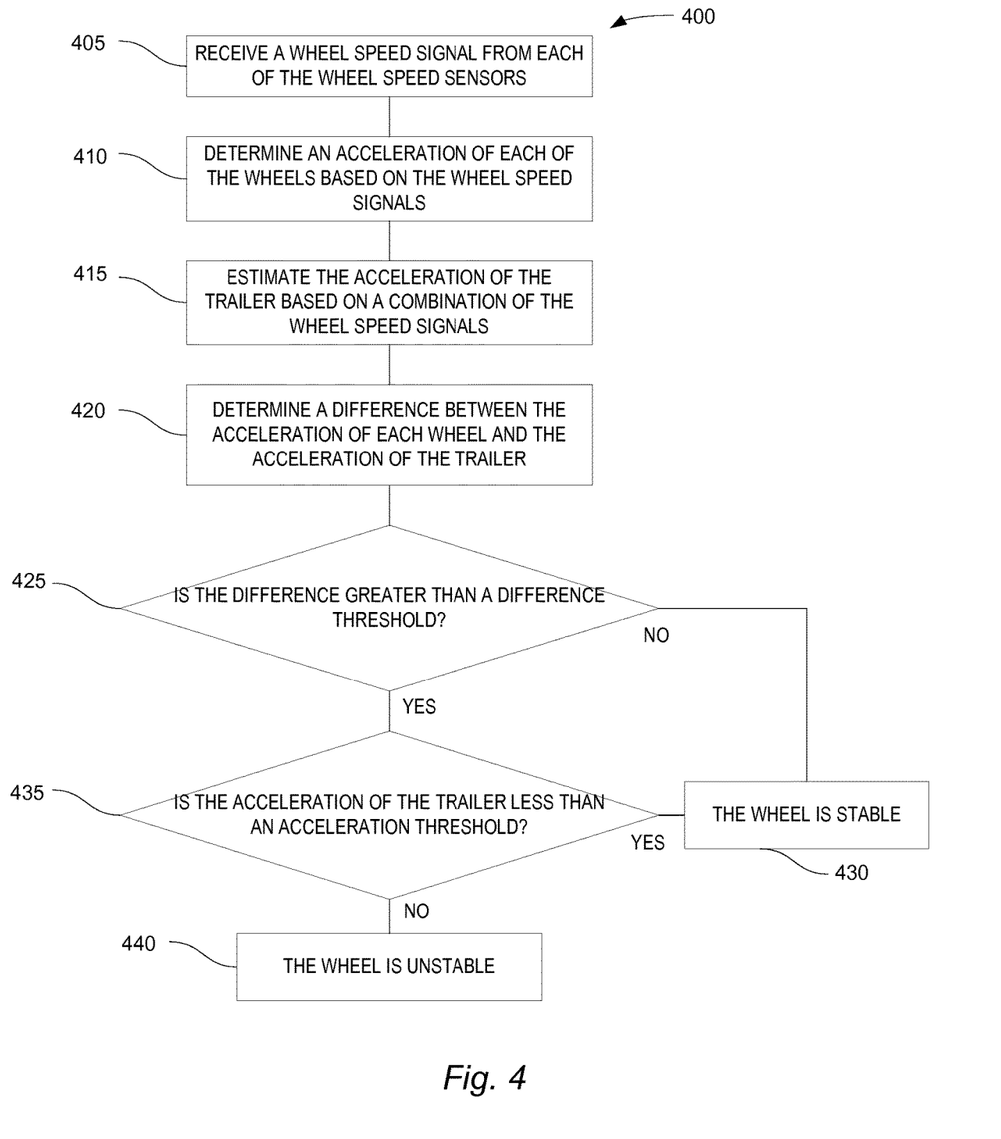
FIG. 4 is a flowchart of a method of determining whether a wheel of the trailer of FIG. 1 is unstable using the trailer braking system of FIG. 2 according to another embodiment.

FIG. 4 illustrates a method 400 of determining whether each of the wheels 120 of the trailer 105 is unstable according to one embodiment. In this embodiment, the controller 205 receives a wheel speed signal from each of the wheel speed sensors 125 (block 405). The controller 205 determines an acceleration of each of the wheels 120 based on the wheel speed signals. In particular, the controller 205 may determine a tangential acceleration of each of the wheels 120 that indicates a change in rotational velocity of each of the wheels 120. In particular, based on a series of pulses received from the wheel speed sensors 125 over a period of time, the controller 205 may determine an instantaneous acceleration and changes in an acceleration of each of the wheels 120. The controller 205 may store the determined values of the acceleration in memory 215. The controller 205 may then access previously stored values of acceleration and velocity for each of the wheels 120. The controller 205 estimates the acceleration of the trailer 105 based on a combination of the wheel speed signals (block 415). In particular, the controller 205 may determine a longitudinal acceleration (i.e., an acceleration or deceleration in the forward direction of movement of the trailer 105) based on the wheel speed signals. The controller 205 may also consider the previously stored values of acceleration and velocity when determining the estimation of the current acceleration of the trailer 105. For example, the controller 205 may determine a baseline acceleration using previous iterations of acceleration and velocity values stored in memory 215.

The controller 205 then determines a difference between the acceleration of each of the wheels 120 and the acceleration of the trailer 105 (block 420). This difference is indicative of the stability of each of the wheels 120. The controller 205 then determines if the difference is greater than a difference threshold (block 425). When the difference is less than the difference threshold, the controller 205 sets the status of the particular wheel to stable (block 430). For example, the controller 205 may set the status flag associated with the particular wheel to "stable." Conversely, when the difference is greater than the difference threshold, the controller 205 determines if the acceleration of the trailer 105 is less than an acceleration threshold (block 435). When the acceleration of the trailer 105 is greater than the acceleration threshold, the controller sets the particular wheel to unstable (block 440). The acceleration threshold sets a lower limit on determinations of stability. For example, when the acceleration is less than a minimum acceleration level, the trailer 105 is either coasting or not in motion.

In some embodiments, the controller 205 sets the status of each of the wheels 120 as stable or unstable based on both the wheel slip, as described in the method 300, and on the acceleration, as described in the method 400. For example, the controller 205 may set the status of a particular wheel to unstable only when the wheel slip is greater than the wheel slip threshold (block 330) and when the difference is greater than the difference threshold (block 435).

Figure 5:
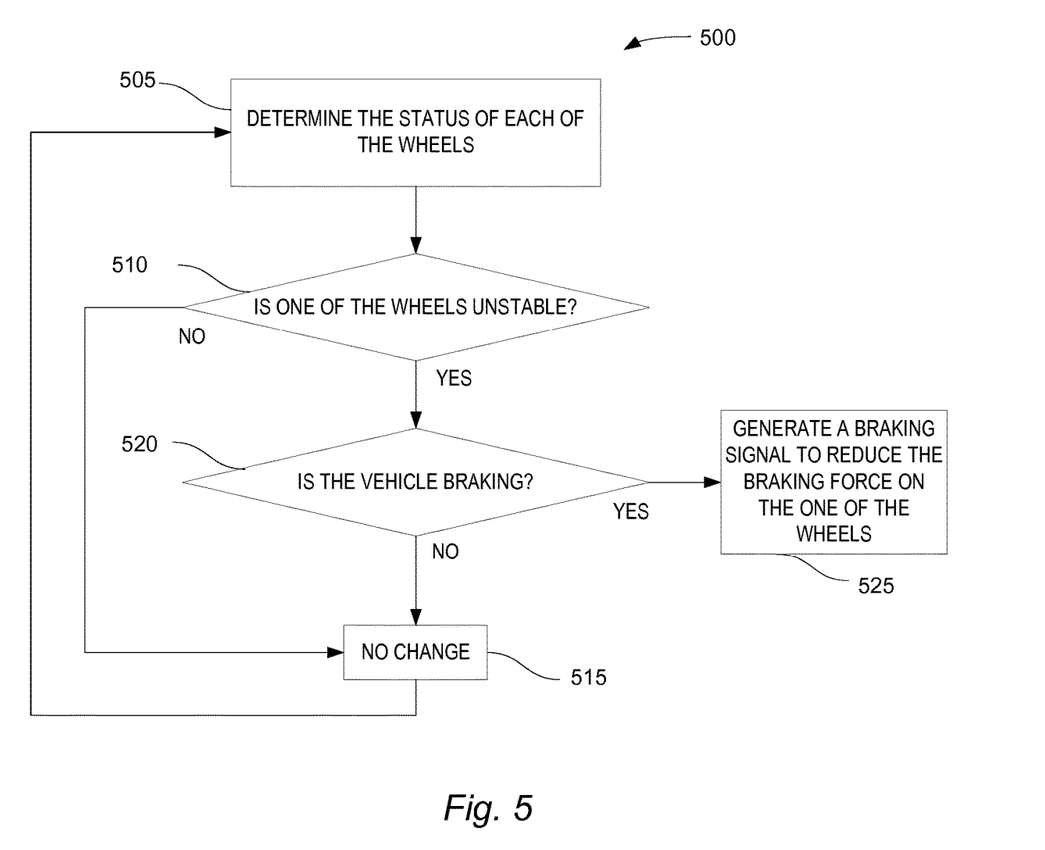
FIG. 5 is a flowchart of a method of braking the trailer of FIG. 1 using the trailer braking system of FIG. 2 according to another embodiment.

FIG. 5 illustrates a method 500 of activating the trailer braking system 110 according to one embodiment (block 505). In this embodiment, the controller 205 determines the status of each of the wheels 120 using the method 300, the method 400, or both (block 505). As part of the status determination, the controller 205 determines whether one of the wheels 120 is unstable (block 510). When none of the wheels 120 are unstable, the controller 205 does not adjust the braking signal (for example, the braking force) applied to any of the wheels 120 (block 515). In this case, for example, the controller 205 may control the braking force for the wheels 120 to be evenly distributed and according to the magnitude of the brake request received from the trailer brake controller. The controller 205 also determines whether the towing vehicle 100 is braking and indicated by the brake request received from the trailer brake controller (block 520). When the towing vehicle 100 is not braking, the controller 205 does not generate the braking signal (block 515). Conversely, when the towing vehicle 100 is braking and the one of the wheels 120 is unstable, the controller 205 generates a braking signal to reduce the braking force on the one of the wheels 120 relative to the other wheels 120 (block 525). The controller 205 may generate the braking signal to reduce the braking force on the one of the wheels 120 based on the amount of wheel slip or the difference in acceleration as determined by method 300 and method 400.

Once the particular wheel is set to either stable or unstable, the controller 205 may reset the status flag of the particular wheel (i.e., set the status flag to stable) when both the wheel slip is greater than the wheel slip threshold (block 330) and when the difference is greater than the difference threshold (block 435). However, in some embodiments, the controller 205 sets the status flag to stable when either the wheel slip is greater than the wheel slip threshold (block 330) or when the difference is greater than the difference threshold (block 435).

Figure 6:
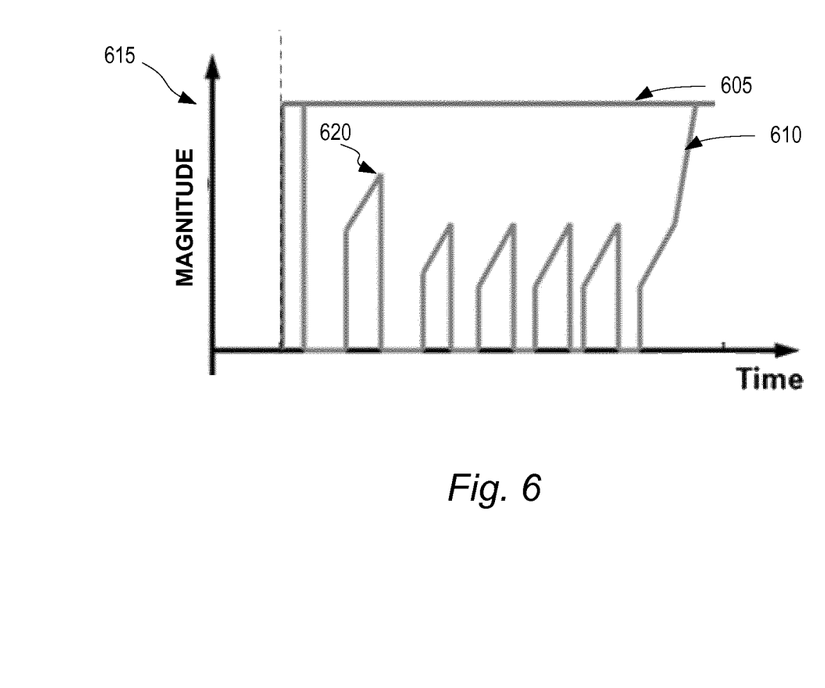
FIG. 6 is a graph of a magnitude of braking signals over time according to one embodiment.

FIG. 6 illustrates examples of a brake request 605 generated by the towing vehicle 100 and sent to the controller 205, and a braking signal 610 generated by the controller 205 and sent to one of the wheels 120. The brake request 605, as in the example illustrated, includes a single pulse at a magnitude 615. The magnitude 615 varies depending on the amount of brake pedal force sensed by the towing vehicle 100. The braking signal 610, as in the example illustrated, may vary both in a magnitude 620 as well as over time. For example, in some embodiments, the braking signal 610 varies in magnitude 620 based on the magnitude 615 of the brake request 605. The braking signal 610 may also be pulse width modulated (PWM) by the controller 205 based on the stability of the one of the wheels 120 as described by methods above.

Figure 7:
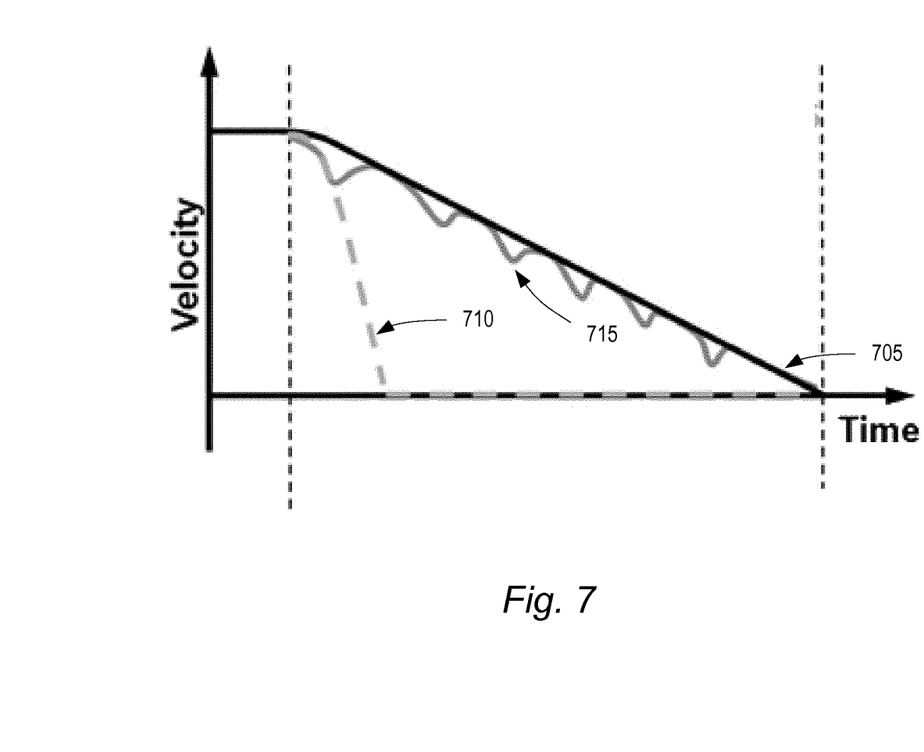
FIG. 7 is a graph of changes in velocity of the trailer of FIG. 1 and the wheel of the trailer during braking.

FIG. 7 illustrates two braking scenarios. In one scenario, the trailer 105 undergoes braking without using the trailer braking system 110. In another scenario, the trailer 105 undergoes braking using the trailer braking system 110. In particular, a first line 705 is representative of a velocity of the trailer 105 during braking. A second line 710 is representative of a velocity of one of the wheels 120 during braking without applying the methods listed above. For example, the second line 710 may represent braking based solely on the brake request 605 without any reduction in braking force as set by the controller 205. In this case, the one of the wheels 120 experiences rapid deceleration, wheel lock, and instability. A third line 715 is representative of a velocity of the one of the wheels 120 during braking when the controller 205 applies one or both of the methods above. In this case, braking force is reduced when the controller 205 detects that the one of the wheels 120 is experiencing excessive wheel slip, deceleration, or both.

Thus, embodiments provide, among other things, a method for braking a trailer using a trailer braking system configured to have independent control over each wheel of the trailer. Various features and advantages of the invention are set forth in the following claims.

The invention claimed is:

1. A method of braking a trailer with a trailer braking system, the method comprising:
   receiving, at a controller, a brake request from a vehicle to apply the trailer braking system;
   receiving, at the controller, a plurality of wheel speed signals from a plurality of wheel speed sensors;
   determining a velocity of the trailer based on the plurality of wheel speed signals;
   determining a wheel speed of one of a plurality of wheels based on one of the plurality of wheel speed signals;
   comparing the velocity of the trailer to the wheel speed to obtain a difference value;
   determining that the one of the plurality of wheels is unstable when the difference value exceeds a threshold; and
   generating a braking signal to reduce a braking force on the one of the plurality of wheels, when the one of the plurality of wheels is unstable and when the brake request is received
   wherein the method further includes
   determining a longitudinal acceleration of the trailer based on the plurality of wheel speed signals;
   determining a tangential acceleration of each of the plurality of wheels based on the plurality of wheel speed signals;
   comparing the longitudinal acceleration of the trailer with the acceleration of each of the plurality of wheels to obtain a second difference value; and
   generating the braking signal to reduce the braking force on the one of the plurality of wheels when the second difference value is greater than a second threshold.

2. The method of braking the trailer according to claim 1, the method further comprising: setting a minimum acceleration threshold for the trailer; and generating the braking signal to reduce the braking force on the one of the plurality of wheels only when the minimum acceleration threshold for the trailer is exceeded.

3. The method of braking the trailer according to claim 1, the method further comprising: setting a minimum velocity threshold for the trailer; and generating the braking signal to reduce the braking force on the one of the plurality of wheels only when the velocity threshold for the trailer is exceeded.

4. The method of braking the trailer according to claim 1, the method further comprising:
   determining another wheel speed of another one of the plurality of wheels based on another one of the plurality of wheel speed signals;
   comparing the velocity of the trailer to the another wheel speed to obtain another difference value;
   determining that the another one of the plurality of wheels is unstable when the another difference value exceeds another threshold; and
   generating the braking signal to reduce the braking force on the another one of the plurality of wheels, when the another one of the plurality of wheels is unstable and when the brake request is received.

5. The method of braking the trailer according to claim 1, the method further comprising: determining a wheel slip of one of the plurality of wheels, the wheel slip indicative of a difference in velocity between the one of the plurality of wheels and a road surface, wherein generating the braking signal to reduce the braking force on the one of the plurality of wheels occurs when the wheel slip is greater than a wheel slip threshold.

6. The method of braking the trailer according to claim 1, the method further comprising:
   determining wheel speeds of each of the plurality of wheels on the trailer;
   individually determining if each wheel of the plurality of wheels is unstable; and
   generating the braking signal to reduce the braking force on each one of the plurality of wheels independently when each respective wheel of the plurality of wheels is unstable and when the brake request is received.

7. The method of braking the trailer according to claim 1, further comprising: mounting the controller on the trailer, the controller configured to be detachably coupled to a trailer brake controller positioned on a towing vehicle; and electrically coupling the plurality of wheel speed sensors to the controller.

8. The method of braking the trailer according to claim 1, wherein generating the braking signal to reduce the braking force on the one of the plurality of wheels includes sending a pulse width modulation (PWM) signal to the one of the plurality of wheels.

9. A trailer braking system comprising:
   a plurality of wheel speed sensors; and
   a controller configured to
      receive signals from the plurality of wheel speed sensors and to receive a braking request from a vehicle to apply a trailer brake,
      receive a plurality of wheel speed signals from the plurality of wheel speed sensors,
      determine a longitudinal acceleration of the trailer based on the plurality of wheel speed signals;
      determine a tangential acceleration of each of the plurality of wheels based on the plurality of wheel speed signals;
      compare the longitudinal acceleration of the trailer with the acceleration of each of the plurality of wheels to obtain a second difference value; and
      generate the braking signal to reduce the braking force on the one of the plurality of wheels when the second difference value is greater than a second threshold.

10. The trailer braking system according to claim 9, wherein the controller is further configured to set a minimum acceleration threshold for the trailer, and generate the braking signal to reduce the braking force on the one of the plurality of wheels only when the minimum acceleration threshold for the trailer is exceeded.

11. The trailer braking system according to claim 9, wherein the controller is further configured to set a minimum velocity threshold for the trailer, and generate the braking signal to reduce the braking force on the one of the plurality of wheels only when the velocity threshold for the trailer is exceeded.

12. The trailer braking system according to claim 9, wherein the controller is further configured to determine another wheel speed of another one of the plurality of wheels based on another one of the plurality of wheel speed signals, compare the velocity of the trailer to the another wheel speed to obtain another difference value, determine that the another one of the plurality of wheels is unstable when the another difference value exceeds another threshold, and generate the braking signal to reduce the braking force on the one of the plurality of wheels when the another one of the plurality of wheels is unstable and when the brake request is received.

13. The trailer braking system according to claim 9, wherein the controller is further configured to determine a wheel slip of one of the plurality of wheels, the wheel slip indicative of a difference in velocity between the one of the plurality of wheels and a road surface, wherein the controller is configured to generate the braking signal to reduce the braking force on the one of the plurality of wheels when the wheel slip is greater than a wheel slip threshold.

14. The trailer braking system according to claim 9, wherein the controller is further configured to determine wheel speeds of each of the plurality of wheels on the trailer, individually determine if each wheel of the plurality of wheels is unstable, and generate the braking signal to reduce the braking force on each of the plurality of wheels independently when each respective wheel of the plurality of wheels is unstable and when the braking request is received.

15. The trailer braking system according to claim 9, wherein the controller is further configured to position the controller on the trailer, the controller configured to be detachably coupled to a trailer brake controller positioned on a towing vehicle, and electrically couple the plurality of wheel speed sensors to the controller.

16. The trailer braking system according to claim 9, wherein the controller is configured to generate the braking signal to reduce the braking force on the one of the plurality of wheels by sending a pulse width modulation (PWM) signal to the one of the plurality of wheels.

17. A trailer braking system comprising:
a plurality of wheel speed sensors; and
a controller configured to
    receive signals from the plurality of wheel speed sensors and to receive a braking request from a vehicle to apply a trailer brake,
    receive a plurality of wheel speed signals from the plurality of wheel speed sensors,
    determine a longitudinal acceleration of the trailer based on the plurality of wheel speed signals;
determine a tangential acceleration of each of the plurality of wheels based on the plurality of wheel speed signals;
compare the longitudinal acceleration of the trailer with the acceleration of each of the plurality of wheels to obtain a second difference value; and
generate the braking signal to reduce the braking force on the one of the plurality of wheels when the second difference value is greater than a second threshold.

* * * * *